US012785834B2

(12) United States Patent
Snelling et al.

(10) Patent No.: US 12,785,834 B2
(45) Date of Patent: Nov. 3, 2026

(54) METHOD FOR TIME ALIGNING IN-BAND ON-CHANNEL DIGITAL RADIO AUDIO WITH FM RADIO AUDIO

(71) Applicant: iBiquity Digital Corporation, Calabasas, CA (US)

(72) Inventors: William Snelling, Calabasas, CA (US); Russell Iannuzzelli, Calabasas, CA (US); Paul J. Peyla, Calabasas, CA (US); Jeffrey S. Baird, Calabasas, CA (US)

(73) Assignee: iBiquity Digital Corporation, Columbia, MD (US)

( * ) Notice: Subject to any disclaimer, the term of this patent is extended or adjusted under 35 U.S.C. 154(b) by 186 days.

(21) Appl. No.: 18/705,150

(22) PCT Filed: Oct. 28, 2022

(86) PCT No.: PCT/US2022/048177
§ 371 (c)(1),
(2) Date: Apr. 26, 2024

(87) PCT Pub. No.: WO2023/076566
PCT Pub. Date: May 4, 2023

(65) Prior Publication Data

US 2025/0015911 A1 Jan. 9, 2025

Related U.S. Application Data

(60) Provisional application No. 63/273,763, filed on Oct. 29, 2021.

(51) Int. Cl.
*H04H 20/12* (2008.01)
*H04H 60/07* (2008.01)

(52) U.S. Cl.
CPC ............ *H04H 20/12* (2013.01); *H04H 60/07* (2013.01)

(58) Field of Classification Search
CPC ............................... H04H 20/12; H04H 60/07
See application file for complete search history.

(56) References Cited

U.S. PATENT DOCUMENTS 6,836,660 B1 * 12/2004 Wala ................... H04W 88/085 455/434
6,912,243 B1 * 6/2005 Ishioka ................ H04B 1/7113 370/335

(Continued)

FOREIGN PATENT DOCUMENTS

EP 2573773 A2 3/2013

OTHER PUBLICATIONS

International Search Report for Application No. PCT/US2022/048177 mailed Mar. 6, 2023, 2 pages.

*Primary Examiner* — Bhavesh M Mehta
*Assistant Examiner* — Joseph J. Yamamoto
(74) *Attorney, Agent, or Firm* — Lerner David LLP

(57) ABSTRACT

A method comprises: receiving a first audio stream that conveys audio content and a second audio stream that conveys the audio content and is delayed relative to the first audio stream by a time delay; one-sided filtering first audio segments of the first audio stream to pass only positive frequencies of the first audio segments to first filtered audio segments; one-sided filtering second audio segments of the second audio stream to pass only positive frequencies of the second audio segments to second filtered audio segments; cross correlating the first filtered audio segments against corresponding ones of the second filtered audio segments, to produce cross-correlation results; detecting a peak indicated by the cross-correlation results; and estimating the time (Continued)

delay based on a position of the peak, to produce an estimated time delay.

13 Claims, 8 Drawing Sheets

(56) References Cited

U.S. PATENT DOCUMENTS

| | | | | |
|---|---|---|---|---|
| 9,065,716 | B1 * | 6/2015 | Bynum | G08G 5/26 |
| 10,177,729 | B1 * | 1/2019 | Pahuja | H03G 3/344 |
| 2012/0288124 | A1 * | 11/2012 | Fejzo | H04R 5/02<br>381/303 |
| 2013/0077805 | A1 * | 3/2013 | Kirsch | H04N 21/8106<br>381/119 |
| 2017/0302432 | A1 | 10/2017 | Kroeger et al. | |
| 2019/0190691 | A1 | 6/2019 | Kroeger et al. | |

* cited by examiner

400

METHOD FOR TIME ALIGNING IN-BAND ON-CHANNEL DIGITAL RADIO AUDIO WITH FM RADIO AUDIO

CROSS-REFERENCE TO RELATED APPLICATIONS

This application is a national phase entry under 35 U.S.C. § 371 of International Application No. PCT/US2022/048177, filed Oct. 28, 2022, which claims the benefit of U.S. Provisional Application No. 63/263,763, filed Oct. 29, 2021, all of which are hereby incorporated by reference in-its their entirety.

TECHNICAL FIELD

This disclosure relates to digital radio broadcasting.

BACKGROUND

Digital radio broadcasting technology delivers digital audio and data services to radio receivers using existing radio bands. One form of digital radio broadcasting, referred to as in-band on-channel (IBOC) digital radio broadcasting, transmits a digital radio broadcast signal (referred to as a "digital signal") and an analog radio broadcast signal (referred to as an "analog signal") simultaneously on the same frequency using digitally modulated subcarriers or sidebands to multiplex digital information on an amplitude modulation (AM) or frequency modulation (FM) analog modulated carrier signal. HD Radio™ technology, developed by iBiquity Digital Corporation, is one example of an IBOC implementation for digital radio broadcasting and reception. HD Radio broadcasting can transmit a digital radio broadcasting hybrid waveform (referred to simply as a "hybrid waveform") that simultaneously combines or multiplexes the analog signal with the digital signal. The analog signal may be modulated to convey analog FM audio (referred to simply as "FM audio"), while the digital signal may be modulated to carry "digital audio."

Thus, HD Radio broadcasting can transmit two redundant audio sources multiplexed onto the hybrid waveform, including (i) the FM audio, and (ii) the digital audio, designated as "HD1 audio," which carries the same audio content as the FM audio. The designator "HD1" indicates redundancy between the FM audio and the HD1 audio. The FM audio exists primarily to support legacy FM technology but can also provide backup audio whenever the HD1 audio is impaired. A digital radio receiver, such as an HD radio receiver, may recover the FM audio by demodulating the analog signal from the hybrid waveform, and recover the HD1 audio by demodulating and decoding the digital signal from the hybrid waveform. In the HD radio receiver, a process of selecting, or possibly combining, FM and HD1 audio is called blending. For blending to occur without annoying switching artifacts, the FM and HD1 audio (sources) should be precisely aligned in time. Because FM and HD1 audio are processed independently by broadcast equipment at a radio broadcaster prior to being multiplexed onto the hybrid waveform, precise time alignment of the two is difficult using a feed-forward approach.

Moreover, measuring a time offset between the FM and HD1 audio is difficult because one or both types of audio may have significant and independent distortions from original audio content conveyed/carried by both types of audio. For example, differing group delays (i.e., the relative group delay) between the FM and HD1 audio can result from differing processing performed on the FM and HD1 audio. Specifically, HD1 audio is severely compressed which leads to distortion upon decompression especially at higher frequencies, while FM audio is often highly filtered by the radio broadcaster to enhance bass and other audio components and is additionally corrupted by broadcast modulation, over-the-air (OTA) transmission, and receiver demodulation processes. Measuring the time offset is further complicated because the relative group delay varies over audio frequency.

DESCRIPTION OF EMBODIMENTS

Embodiments

Figure 1:
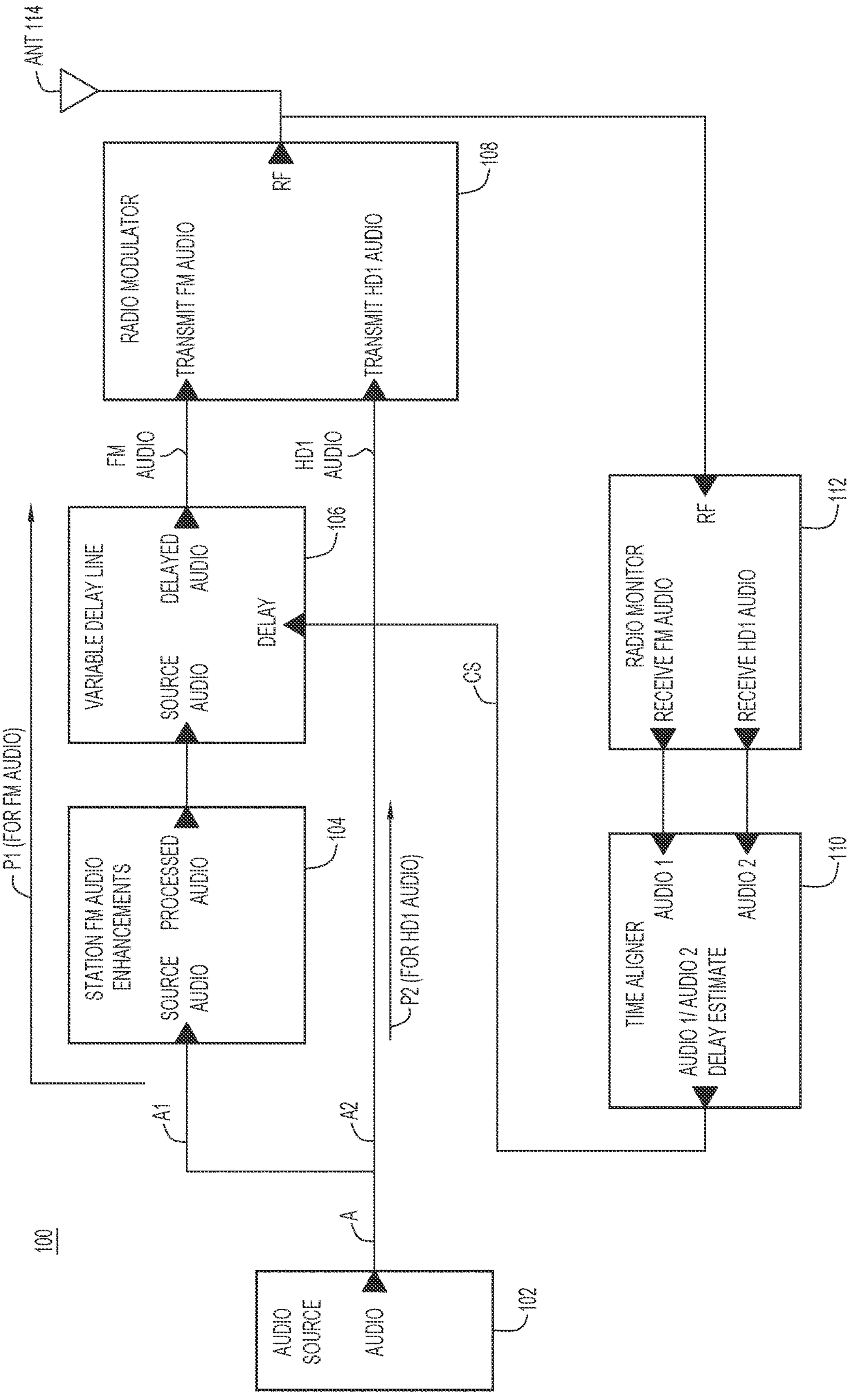
FIG. 1 is a functional block diagram of an example apparatus in the form of a IBOC digital radio broadcast equipment suite or system in which time alignment of two audio streams may be implemented.

Embodiments presented herein (also referred to as "time-alignment embodiments") overcome the challenges described above and provided advantages described below. At a high level, a common audio stream is split to provide the common audio stream to a first path and a second path in parallel. That is, a first common audio stream is provided to the first path and a second common audio stream is provided to the second path. The first path and the second path perform different audio processing on their respective common audio streams (which contain the same audio content), to produce a first audio stream that is processed and a second audio stream that is processed, respectively. The first audio stream and the second audio stream are time delayed relative to one another by a time delay or offset imparted by the different audio processing. In addition, the first audio stream and the second audio stream include different audio distortions introduced by the different audio processing.

In accordance with the embodiments presented herein, a time aligner accurately measures or estimates the time delay between the first audio stream and the second audio stream to produce a time delay estimate, and uses the time delay estimate to correct or remove the time delay so that the first audio stream and the second audio stream are closely time aligned. For example, the time delay estimate may be used to control a controllable time delay introduced into one of the first path (and into the first audio stream) and the second path (and into the second audio stream) in order to time align the two audio streams. The time aligner operates in a time-alignment feedback loop to maintain time alignment between the first audio stream and second audio stream over time.

In an embodiment, the time aligner may be implemented in IBOC digital radio broadcasting to accurately measure or estimate a relative time offset between FM audio and HD1 audio, for example, and then correct for or remove the time offset using the estimate so that the two types of audio are closely time aligned for OTA transmission in an IBOC digital radio broadcast hybrid waveform. The time aligner may time align the FM audio and the HD1 audio within +/−68 microseconds (us), for example.

As alluded to above, the relative group delay between FM and HD1 audio can vary over audio frequency. An effect of this is that when audio content is confined to a fixed frequency, a measured time delay between the FM and HD1 audio will be different depending on the fixed frequency; however, tests performed in association with the embodiments show that, for typical audio content, a listener often perceives a fixed time delay notwithstanding the different time delay. Accordingly, embodiments presented herein advantageously estimate and cancel this perceived time delay.

As used herein, "audio" may be represented as a sequence of data values, such as a sequence of audio samples each having a respective amplitude/magnitude and a respective time associated with the respective amplitude/magnitude. In the ensuing description, "audio" may be equivalently referred to as an "audio stream" or an "audio signal," depending on context.

The embodiments include, but are not limited to, the following features:

a. Use of a one-sided prefilter before cross correlation between first and second audio streams (e.g., FM audio and HD1 audio) to eliminate the sensitivity of the cross correlation to a phase shift between the first and second audio streams.
b. Use of a passband in the one-sided prefilter that is strategically positioned and sufficiently narrow to eliminate the confounding effects of frequency variation of group delay between the first audio stream and the second audio stream but still giving an estimate of time offset that corresponds to a listeners perception.
c. Averaging multiple cross correlations before making a peak detection. This eliminates most outliers in the alignment offset detection.
d. Definition of a unique quality statistic or factor that indicates validity and quality of the cross correlation. This statistic yields very good false alarm and detection probabilities.
e. Use of a non-linear control rule that provides both quick convergence and stable tracking of an offset feedback loop used to estimate the time offset.

Advantageously, the embodiments:

a. Allow for either radio broadcast or receiver equipment to automatically time align HD1 and FM audio.
b. May be implemented as an all-software solution that minimally taxes computer resources.
c. Allow processing load to be arbitrarily reduced by skip sampling of FM and HD1 audio.

The embodiment that employs the time aligner in IBOC digital radio broadcasting, e.g., HD Radio broadcasting, is described below in connection with FIGS. 1-4. More generalized embodiments that use the time aligner are then described in connection with FIGS. 5-7.

FIG. 1 is a simplified functional block diagram of an example IBOC digital radio broadcast equipment suite or system 100 in which time alignment of two audio streams is implemented. System 100 may be located at and operated by a radio broadcaster, for example. System 100 includes a content or audio source 102, a station FM audio enhancer 104, a variable delay line 106, a radio modulator 108 (e.g., an HD radio modulator), a time aligner 110 implemented in accordance with the embodiments presented herein, and a radio monitor 112 (e.g., an HD radio monitor). Audio source 102 generates original audio A (i.e., an original audio stream A), such as program audio, which is divided or split into (i) audio A1 (i.e., a first audio stream A1) that is directed along a path P1 for FM audio, and (ii) audio A2 (i.e., a second audio stream A2) that is directed along a path P2 for HD1 audio. Audio A1 and A2 carry the same or common audio content (i.e., the same content as original audio A). Audio A1 and A2 are time-aligned with one another.

Path P1 performs first audio processing on audio A1 to produce FM audio for OTA transmission, while path P2 performs second audio processing on audio A2 to produce HD1 audio for OTA transmission. Different audio processing on paths P1 and P2 imparts a time delay between the FM audio and the HD1 audio. For example, path P1 includes station FM audio enhancer 104 followed by variable delay line 106 to process and time-delay audio A1, respectively, to produce the FM audio. Specifically, station FM audio enhancer 104 processes audio A1 according to requirements of the radio broadcaster and in ways that can depend on a type of audio content carried by the audio (e.g., rock music, talk radio, and so on). Such processing introduces considerable phase distortion into audio A1, which greatly complicates time alignment of the FM audio and the HD1 audio. In addition, variable delay line 106 introduces or imparts a controlled time delay into audio A1 (as previously processed by station FM audio enhancer 104) in accordance with a time delay control signal CS applied to a time delay control input of the time aligner, to produce the FM audio. Variable delay line 106 provides the FM audio to a transmit FM audio input of radio modulator 108.

In the example of FIG. 1, path P2 does not actually perform any audio processing on audio A2, but simply delivers the audio, as HD1 audio, to a transmit HD1 audio input of radio modulator 108. Therefore, the FM audio and the HD1 presented at inputs of radio modulator 108 are time delayed relative to one another by the additive time delays introduced by station FM audio enhancer 104 and variable delay line 106. In other examples, path P2 may perform audio processing on audio A2, such as audio compression, encoding, and the like, in which case the time delay between the FM audio and the HD1 audio will differ from the time delay when audio processing is absent from path P2. Because the radio modulator 108 processes FM and HD1 audio differently, there is an additional relative time delay between the FM and HD1 audio as seen at the point of transmission 114 (antenna). In a similar manner, the radio monitor 112 introduces an additional relative time delay between the FM and HD1 audio. All of these sources of relative time delay should be canceled by the variable delay line 106.

Radio modulator 108 encodes, modulates, and multiplexes the HD1 audio and the FM audio onto an IBOC digital radio hybrid waveform, which is transmitted OTA via antenna ANT. Radio modulator 108 may employ any known or hereafter developed technique to generate the IBOC digital radio hybrid waveform. In addition, radio modulator 108 provides the IBOC hybrid digital radio waveform to radio monitor 112. Radio monitor 112 can be any known or hereafter developed digital receiver configured to recover the FM audio and the HD1 audio, separately, from the IBOC hybrid digital waveform. Radio monitor 112 provides the FM audio and the HD1 audio as recovered to separate inputs audio 1 and audio 2 of time aligner 110, respectively.

According to embodiments presented herein, time aligner 110 estimates the time delay between the FM audio and the HD1 audio, and generates time delay control signal CS representative of the time delay. Radio monitor 112 provides time delay control signal CS to the time delay control input of variable delay line 106. Variable delay line 106 adjusts the controllable time delay imparted to the processed FM audio produced by station FM audio enhancer 104 in accordance with time delay control signal CS, to time align the FM audio with the HD1 audio at the output of the radio monitor 112. Variable delay line 106 may employ any known or hereafter developed technique to impart a time delay into an audio stream. For example, variable delay line 106 may buffer incoming audio samples for a time period equal to the time delay, and then output the buffered audio samples after the time delay, and so on.

In a simplified embodiment, the FM audio and the HD1 audio may be provided directly to time aligner 110, bypassing radio monitor 112. Thus, radio monitor 112 may be omitted from the simplified embodiment.

Figure 2:
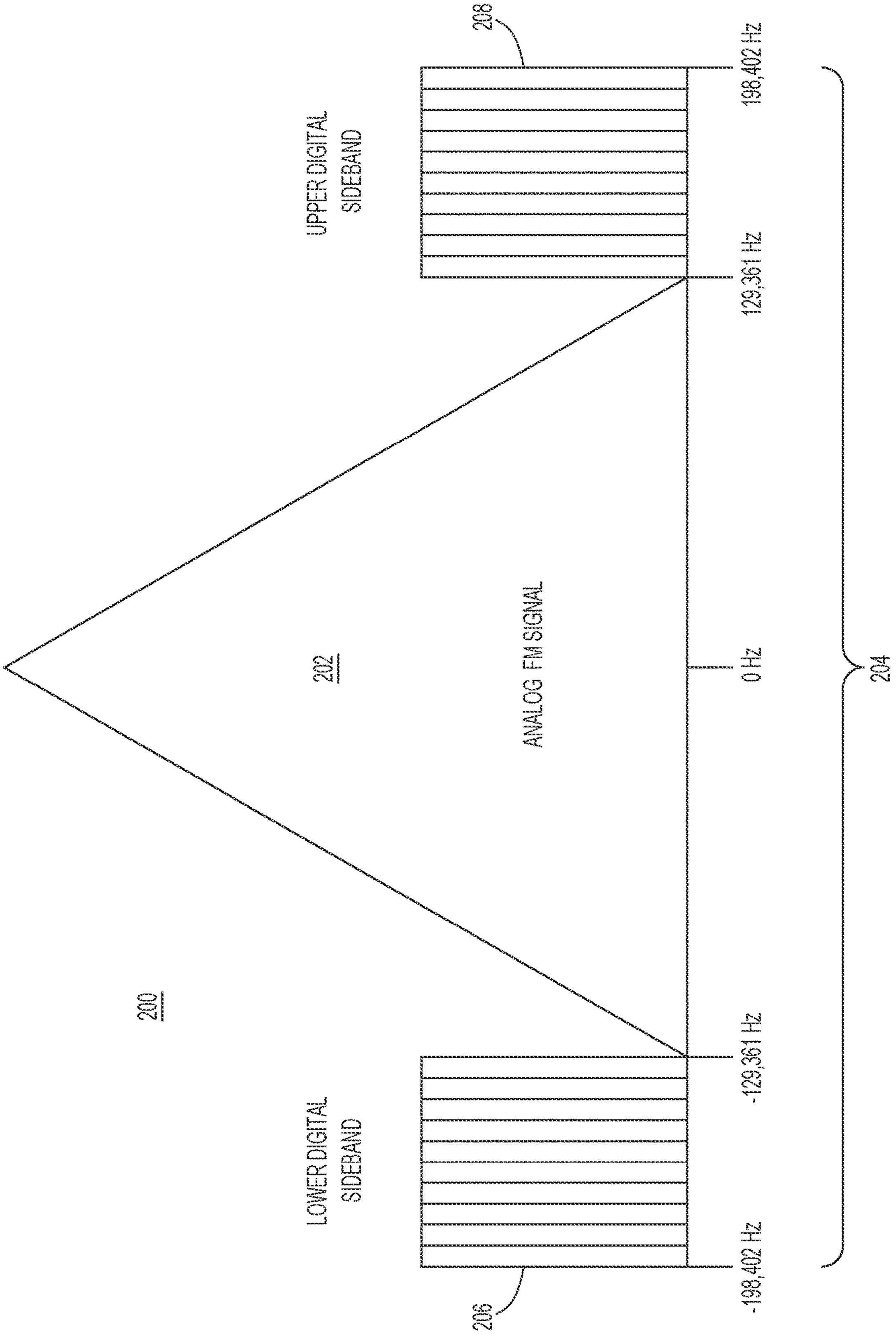
FIG. 2 is a schematic representation of an example IBOC digital radio hybrid waveform.

FIG. 2 is a schematic representation of an IBOC digital radio hybrid waveform 200 (referred to simply as a "hybrid waveform"). The hybrid waveform 200 includes an analog signal 202 located in a center of a radio broadcast channel 204. The analog signal 202 is modulated using analog modulation, such as FM, to convey analog audio (e.g., FM audio). In another configuration, the analog signal may be modulated using AM. The hybrid waveform 200 also includes a digitally modulated signal comprising a first plurality of evenly spaced subcarriers (depicted as vertical rectangles) in a lower digital sideband 206, and a second plurality of evenly spaced subcarriers in an upper digital sideband 208. The digitally modulated signal conveys digital audio, such as HD1 audio that is redundant with the analog audio. In an example, the digital audio is modulated onto the subcarriers using orthogonal frequency-division multiplexing (OFDM).

Figure 3:
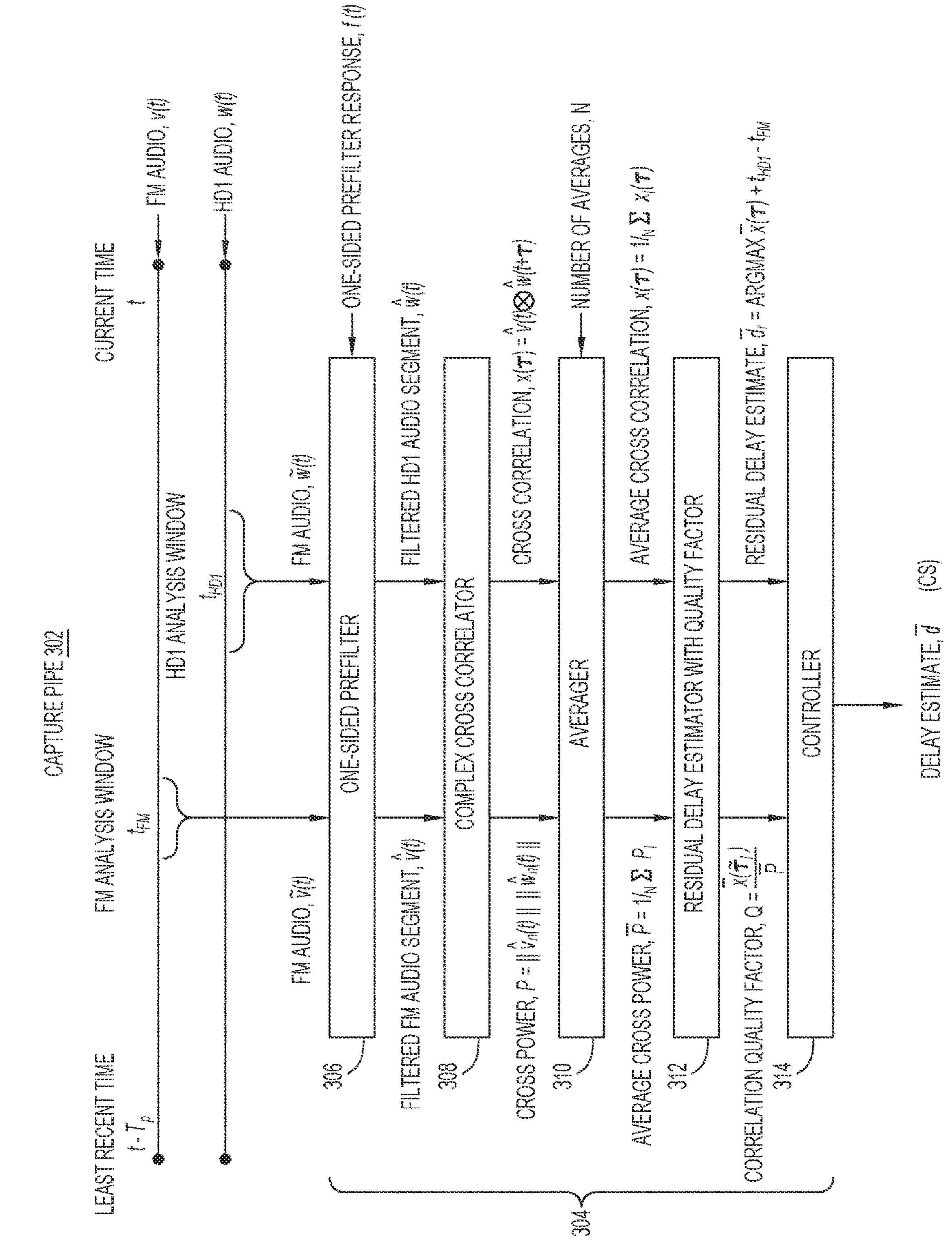
FIG. 3 is a flowchart of an example time aligner algorithm implemented by a time aligner of FIG. 1 to estimate the time delay between the two audio streams.

FIG. 3 is flowchart of an example time aligner algorithm 300 implemented by time aligner 110 to estimate the time delay between the FM audio and the HD1 audio, as presented at respective inputs of the time aligner. In the ensuing description, "time delay" and "delay" have the same meaning and may be used interchangeably. Before alignment adjustments derived by time aligner 110, the HD1 audio is time delayed relative to the FM audio (as described above by way of example) by d seconds. An objective of time aligner 110 is to produce an estimate of this delay, $\bar{d}$, and use the estimate to cancel out the time delay between the two audio streams. An error in this adjustment is a residual delay, $d_r = d - \bar{d}$. The time aligner 110 measures the residual delay by searching the FM and HD1 audio for audio features that closely match one another. The difference in time between matching features serves as an estimate of the residual delay between the two audio streams and is denoted, $\bar{d}_r$.

The time aligner 110 has two modes of operation, "track" to perform tracking and "search" to perform searching. During search, the true value of the residual delay is unknown, and so many hypothetical residual delays are tested. These hypothetical residual delays are allowed to vary widely both negatively and positively until a candidate residual delay estimate is found. With the candidate residual delay in hand, the time aligner 110 transitions to track, and then uses the candidate residual delay to largely remove the delay between the FM and HD1 audio. After this initial adjustment, the residual delay is close to zero and the time aligner 110 only needs to make small adjustments to the delay estimate.

As shown in FIG. 3, the time aligner 110 includes a capture pipe 302 that receives the FM audio v(t) (also referred to as the "FM audio stream" or "FM audio signal") and the HD1 audio w(t) (also referred to as the "HD1 audio stream" or "HD1 audio signal") from which successive FM audio segments and successive HD1 audio segments that coincide with analysis windows are pulled, respectively, and which are provided to an analysis stack 304. Analysis stack 304 receives the aforementioned audio segments as inputs, and extracts delay estimates from the audio segments. That is, the capture pipe 302 accepts and stores (i.e., captures) audio from the FM and HD1 audio streams and makes the captured audio available for the analysis stack 304. The capture pipe 302 may be implemented as a memory buffer that retains the most recent $T_p$ seconds of audio, but the capture pipe also manages the audio input (I)/output (O) (I/O) as a separate encapsulated process. This frees the analysis stack 304 processing from the burdens of audio I/O. This arrangement allows the time aligner 110 to operate in real-time (processing S seconds of audio over S seconds) or in sub real-time by bypassing audio segments or even in super real-time by processing a large amount of audio in a burst and then waiting for fresh audio to arrive. In particular, the capture pipe permits skip sampling of the audio thereby reducing the processing burden of the time aligner 110 at the cost of latency in adjusting FM/HD1 audio delay.

The analysis stack 304 includes a sequence of mathematical operations that ultimately convert matching (or corresponding) audio segments of FM audio and HD1 audio into residual delay estimates. The analysis stack 304 starts with a one-sided prefilter 306 (also referred to as a "one-sided bandpass prefilter") which pulls, from the capture pipe 302, an FM audio segment, $\tilde{v}(t)$, of T/2 duration centered at time $t-t_{FM}$ and an HD1 audio segment, $\tilde{w}(t)$ of T duration centered at time $t-t_{HD1}$. If the difference in time between the segment centers, $t_{FM}-t_{HD1}$, is close to the residual delay then the two audio segments are expected to match. To mitigate against relative phase distortion between the FM and HD1 audio streams, the audio segments are filtered with one-sided prefilter 306. That is, one-sided prefilter 306 (*i*) filters the FM audio segments using a filter response described below to produce filtered FM audio segments, and (ii) filters the HD1 audio segments (e.g., concurrently with filtering the FM audio segments) using the filter response to produce filtered HD1 audio segments. Thus, this operation produces filtered versions of the FM and HD1 audio segments, $\hat{v}(t)$ and $\hat{w}(t)$. One-sided prefilter 306 may be implemented as first and second parallel pre-filters having the same filter response and that concurrently filter the FM audio segments and the HD1 audio segments. The filter response is described in detail below, but important features are that the filter response is narrowband, bandpass, passes positive frequencies, and rejects all negative frequencies. A side effect of the filter response is that the filtered audio segments are complex (i.e., have real (R) and imaginary (I) components).

Following the one-sided prefilter 306 is a complex cross correlator 308 which takes the two filtered audio segments, $\hat{v}(t)$ and $\hat{w}(t)$, and cross correlates them (i.e., cross correlates corresponding ones of the filtered audio segments) to produce $$x(\tau) = \hat{v}(t) \otimes \hat{w}(t+\tau) = \frac{1}{T}\int_0^T \hat{v}(t)\hat{w}^*(t+\tau)dt.$$

The cross-correlation value or result produced by the cross correlation at t can be taken as a measure of the likeness between $\hat{v}(t)$ and w(t) after a time shift of T. For instance, if $\hat{v}(t)$ and $\hat{w}(t)$ are identical, then the cross correlation should be expected to have a value that is a maximum magnitude at $\tau=0$. If $\hat{w}(t)$ was a time shifted version of $\hat{v}(t)$, $\hat{w}(t)=\hat{v}(t-\hat{\tau})$, then the cross correlation will have a maximum magnitude at $\tau=\hat{\tau}$. Thus the maximum magnitude (or peak) produced by the cross correlation can determine the relative time shift between the two audio segments for a relatively small time shift. Larger time shifts can be determined by time shifting the two audio segments when pulling from the capture pipe. In addition to the cross correlation, the complex cross correlator also computes the cross power, $P=\|\hat{v}_n(t)\|\|\hat{w}_n(t)\|$ where $$\|\hat{v}(t)\| = \sqrt{\frac{1}{T}\int_0^T \hat{v}(t)\hat{v}^*(t)dt}.$$

Following the complex cross correlator is averager 310 which averages the next N cross correlations (i.e., cross-correlation values/results) and cross powers. During the averaging, the analysis stack 304 is refreshing the FM and HD1 audio segments and recomputing the cross correlation and the cross power. During this averaging period, the relative time shift between FM and HD1 audio segments remains constant as does the delay correction, $\bar{d}$ that is applied to the broadcast equipment. The net result of the averager 310 is the average cross power, $\bar{P}=1/N\Sigma P_l$ and the average cross-correlation, $\bar{x}(\tau)=1/N\Sigma x_l(\tau)$.

Following the averager 310 is the residual delay estimator with quality factor 312. The averager 310 does a good job of reducing the effects of audio segments with poor autocorrelation which will often produce correlation peaks that correspond to highly erroneous delay estimates (outliers). Averaging makes the maximum magnitude or peak of resultant average cross correlation an accurate indicator of the time delay between the FM and HD1 audio segments even when some of the pre-average cross correlations are misleading. This estimate of time delay is $\hat{\tau}_l=\text{argmax}(\bar{x}(\tau))$ which can then be used to compute the residual delay as $\bar{d}_r=\hat{\tau}_l+t_{FM}-t_{HD1}$. In addition, a correlation quality factor is computed as $$Q = \frac{\bar{x}(\hat{\tau}_l)}{\bar{P}}.$$

The correlation quality factor is another measure of how well the FM audio segments match with the corresponding HD1 audio segments. If the segments are identical, the factor equals one and if they are very different, which would occur with differing audio content, then the factor is close to zero. The correlation quality factor is used in follow-on processing to accept or reject residual delay estimates. In the search mode, the correlation quality factor indicates the putative residual delay, $t_{FM}-t_{HD1}$, is close to the actual residual delay, d, which cues the time aligner 110 to transition to the track mode. The correlation quality factor can also be used to combine multiple residual delay estimates to achieve a more accurate delay estimate. The correlation quality factor is also used to reject rogue residual delay estimates which could throw off tracking.

The controller 314 receives the residual delay estimate, $\bar{d}_r$, and the correlation quality factor, Q, to produce the delay estimate, $\bar{d}$. Implicitly, the controller 314 makes a new delay estimate by using (1) the correlation quality factor, (2) previous delay adjustments made with previous delay estimates, (3) the time lapse between when a delay estimate is presented to the broadcast equipment and when that delay estimate is applied, and (4) the tracking bandwidth.

For efficiency, the one-sided prefilter 306 and complex cross correlation performed by complex cross correlator 308 are implemented in the frequency domain with a Fast Fourier Transform (FFT), weighting, Inverse FFT (IFFT) combination. Although not strictly numerically equivalent, this produces nearly identical delay estimates and quality factors.

One-sided prefilter 306 is now described in further detail. The cross-correlation function between the FM audio stream/signal v(t) and the HD1 audio stream/signal w(t) can be expressed as, $$v(t) \otimes w(t+\tau) = \frac{1}{T}\int_0^T v(t)w^*(t+\tau)dt,$$

where $\tau$ can be interpreted as a putative time shift. When $\tau$ is equal to the negative of the actual time shift, $\hat{\tau}$, the cross correlation value/result will typically peak but because the FM audio is processed differently from the HD1 audio, the magnitude and position of the of the peak is often degraded. In particular, a phase shift between the FM and HD1 audio signals is the primary culprit in this degradation. For example, if the phase shift is equal to $\pi/2$, then it will cause the cross-correlation peak at $\tau=-\hat{\tau}$ to be zero even if the signals are otherwise identical which implies the cross-correlation peak is at some different time and the estimate of the time shift is thrown off. One way to avoid this is to apply the one-sided prefilter and then cross correlate the resulting complex envelopes of the FM and HD1 signals as filtered. A one-sided prefilter passes positive frequency components while rejecting negative frequency components. Below is a proof that preprocessing the FM and HD1 audio signals with a one-sided prefilter makes the magnitude of the cross correlation function invariant to a phase shift between the signals.

Let v(t) and w(t) be two real, continuous, signals that are periodic with period T. In practice, the signals under analysis are not periodic but can be made that way by windowing and periodic extension. The cross correlation of two signals that have been windowed and periodically extended is a good approximation to the cross correlation between the original two signals. Under these assumptions v(t) and w(t), can be Fourier expanded, $$v(t) = V_0 + \sum_{k=1}^{\infty}\left(V_k e^{j2\pi kt/T} + V_k^* e^{-j2\pi kt/T}\right), \text{ and}$$

$$w(t) = W_0 + \sum_{k=1}^{\infty}\left(W_k e^{j2\pi kt/T} + W_k^* e^{-j2\pi kt/T}\right).$$

The offsets $V_0$ and $W_0$ can be assumed zero due to bandpass prefiltering. Now the cross correlation between v(t) and w(t) can be expressed as, $$v(t)\otimes w(t+\tau)=\frac{1}{T}\int_{0}^{T}v(t)w(t+\tau)dt=\sum\nolimits_{k=1}^{\infty}2Re\left(V_kW_k^*e^{-j2\pi k\tau/T}\right).$$

Looking at the special case of where w(t) is a phase shifted version of v(t), $W_k=e^{j\theta}V_k$, then the equation becomes $$v(t)\otimes w(t+\tau)=\sum\nolimits_{k=1}^{\infty}w|V_k|^2\cos\left(\theta+2\pi k\tau/T\right),$$

which goes to zero when $\theta=\pi/2$ and $\tau=0$. The $\pi/2$ phase shift causes the cross correlation to be zero when the two signals are time aligned which throws off the measurement of the time offset between the two signals. At least partial degradation of the cross correlation occurs for most other phase shifts as well.

In contrast, applying a one-sided prefilter to v(t) and w(t) eliminates the phase shift variation. The one-sided prefilter rejects the negative frequency components while keeping the positive components unchanged. Specifically, let $\hat{v}(t)$ and $\hat{w}(t)$ be the one-sided filtered version of v(t) and w(t) then $$\hat{v}(t)=\sum\nolimits_{k=1}^{\infty}V_ke^{j2\pi kt/T},\text{ and}$$

$$\hat{w}(t)=\sum\nolimits_{k=1}^{\infty}W_ke^{j2\pi kt/T},$$

and the cross correlation becomes $$\hat{v}(t)\otimes\hat{w}(t+\tau)=\frac{1}{T}\int_{0}^{T}v(t)w^*(t+\tau)dt=\sum\nolimits_{k=1}^{\infty}V_kW_k^*e^{-j2\pi k\tau/T}.$$

Looking at the special case of where w(t) is a phase shifted version of v(t), $W_k=e^{j\theta}V_k$, then the equation becomes $$\hat{v}(t)\otimes\hat{w}(t+\tau)=e^{j\theta}\sum\nolimits_{k=1}^{\infty}|V_k|^2e^{-j2\pi k\tau/T}=e^{j\theta}\hat{v}(t)\otimes\hat{v}(t+\tau).$$

Notice the phase shift has no effect on the magnitude of the cross-correlation function. In other words, $$|\hat{v}(t)\otimes\hat{w}(t+\tau)|=\left|e^{j\theta}\hat{v}(t)\otimes\hat{v}(t+\tau)\right|=|\hat{v}(t)\otimes\hat{v}(t+\tau)|.$$

Therefore, estimation of the time shift between v(t) and w(t) is not affected by a relative phase shift between v(t) and w(t).

It worth noting that taking the magnitude of $\hat{v}(t)$ and $\hat{w}(t)$ before cross correlating, $|\hat{v}(t)|\otimes|\hat{w}(t+\tau)|$, also exhibits an invariance to phase shift.

The strategic placement of a narrow passband in the one-sided prefilter is now described in detail. One of the confounding issues in determining the time offset between FM and HD1 audio streams is the fact that the different processing of the two streams makes the relative delay between the two stream vary over frequency. Measurements using test vectors have shown that when FM audio has been highly processed, there is significant frequency variation in the relative delay. What this means is that as the dominant frequency of the audio changes, then the relative delay between the two audio signals also changes. One way to ameliorate this effect is to only pass a relatively small band of frequencies before cross correlation. This at least produces time-shift estimates that are not affected by the variation in dominant frequency and are therefore consistent. However, consistent estimates may still be biased. One innovation is to select a band and a bandwidth that will produce low variance time-shift estimates that match up to the perceived time shift. It is the perceived time shift that matters because, though the actual time shift is changing over time, the listener will average out the variation and effectively perceive a constant time shift. After many trial-and-error tests with the test vectors, a one-sided prefilter having a one-sided narrowband bandpass filter response was selected that meets the goals of producing consistent time estimates that match up well with the perceived time shift. That is, the one-sided prefilter 306 is a one-sided narrowband bandpass filter.

Figure 4:
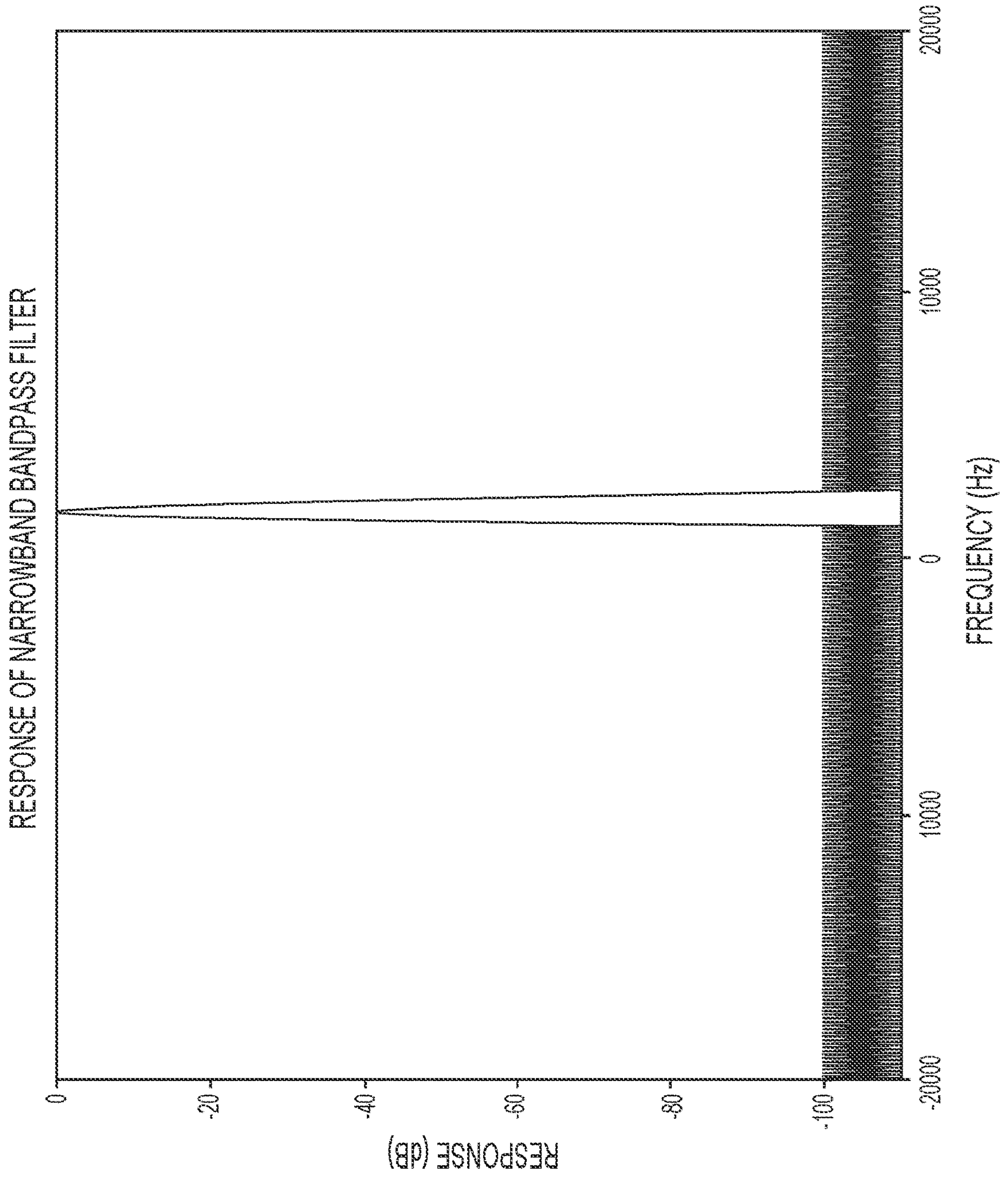
FIG. 4 is a plot of an example one-sided narrowband bandpass filter response of a one-sided prefilter used in the time aligner.

FIG. 4 is a plot of an example filter response 400 of the one-sided prefilter 306 that meets the above-mentioned criteria and achieves the above-mentioned goals. As shown, the filter response 400 is a one-sided narrowband bandpass filter response that has a center frequency of 1723 Hz and a bandwidth of 334 Hz, for example. Notice that the one-sided prefilter effectively only passes positive frequencies while effectively rejecting all negative frequencies which makes it effectively a one-sided prefilter.

Referring again to FIG. 3, averaging of multiple cross correlations before making a peak detection is now described in detail. The quality of the cross-correlation peak and therefore the quality of the time offset estimation has significant variation over time. Therefore, if a time offset estimate is made using a cross correlation of a single audio segment, many outliers result which then somehow need to be filtered out in follow-on processing. Some of this effect is the due to the dominant frequency moving inside and outside the narrow passband of the one-sided prefilter. Some of this effect is due to periods of silence or near silence, and some of this effect is due to the inherent quality of the autocorrelation of the audio segment itself. Basically, certain audio segments give better correlation due to sharp edges and other artifacts of the audio content itself. One strategy to combat outliers is to associate a quality of time offset estimate which can be used to post process out the outliers. Another improvement includes averaging the magnitude of the cross correlations of multiple audio segments and then estimating time offset from the peak of the average cross correlation. One reason this works well is that low quality cross correlations are lower in amplitude and so are automatically derated in the average. Another reason is that averaging increases the effective time span of the cross correlation and so audio variations are averaged out in the cross-correlation process before a time offset estimate is made.

Use of a unique cross correlation quality statistic is now described in detail. Averaging multiple correlations removes most of the outliers but not all. So, it is helpful to associate a quality with a given time shift estimate that can be used to eliminate the remaining outliers and possibly used to determine the weight of a given time shift estimate when combining it with other time shift estimates. A detailed description of the statistic follows.

After filtering with the one-sided prefilter, the FM audio signal $\hat{v}(t)$ and the HD1 audio signal $\hat{w}(t)$ are broken into time segments enumerated by n as $$\hat{v}_n(t) = \hat{v}(nT + t),\ 0 \le t \le T, \text{ and zero otherwise, and}$$

$$\hat{w}_n(t) = \hat{w}(nT + t),\ 0 \le t \le T, \text{ and zero otherwise.}$$

Averaging the cross correlation of N consecutive audio segments yields the average cross correlation, $$x_l(\tau) = \frac{1}{N}\sum_{n=lN}^{lN+N-1} \hat{v}_n(t) \otimes \hat{w}_n(t+\tau),$$

with the l'th time shift estimate $\hat{\tau}_l = \mathrm{argmax}(x_l(\tau))$.

There is a normalizing value $$P_l = \frac{1}{N}\sum_{n=lN}^{lN+N-1} \|\hat{v}_n(t)\|\|\hat{w}_n(t)\|,$$

where $$\|\hat{v}(t)\| = \sqrt{\frac{1}{T}\int_0^T \hat{v}(t)\hat{v}^*(t)dt}.$$

The quality of the estimate is written as $$Q_l = \frac{x_l(\hat{\tau}_l)}{P_l}.$$

An attractive property of the quality factor is that it is equal to one when the two audio signals exactly match and is less than one otherwise. Furthermore, the value decreases as the two audio signals become more dissimilar. This makes it a good choice for a quality factor. Also note that when N=1 the quality factor reduces to the well know normalized correlation value for cross correlation over one segment. In essence, the normalization used in computing the quality factor over many cross correlations is an extension of usual normalization over one cross correlation.

Generalized time-alignment embodiments are described below in connection with FIGS. 5 and 6. The generalized time-alignment embodiments accurately measure or estimate a relative time offset or delay between first audio (i.e., a first audio stream) and second audio (i.e., a second audio stream), and then correct for or remove the time offset or delay using the estimate so that the first audio and the second audio are closely time aligned.

Figure 5:
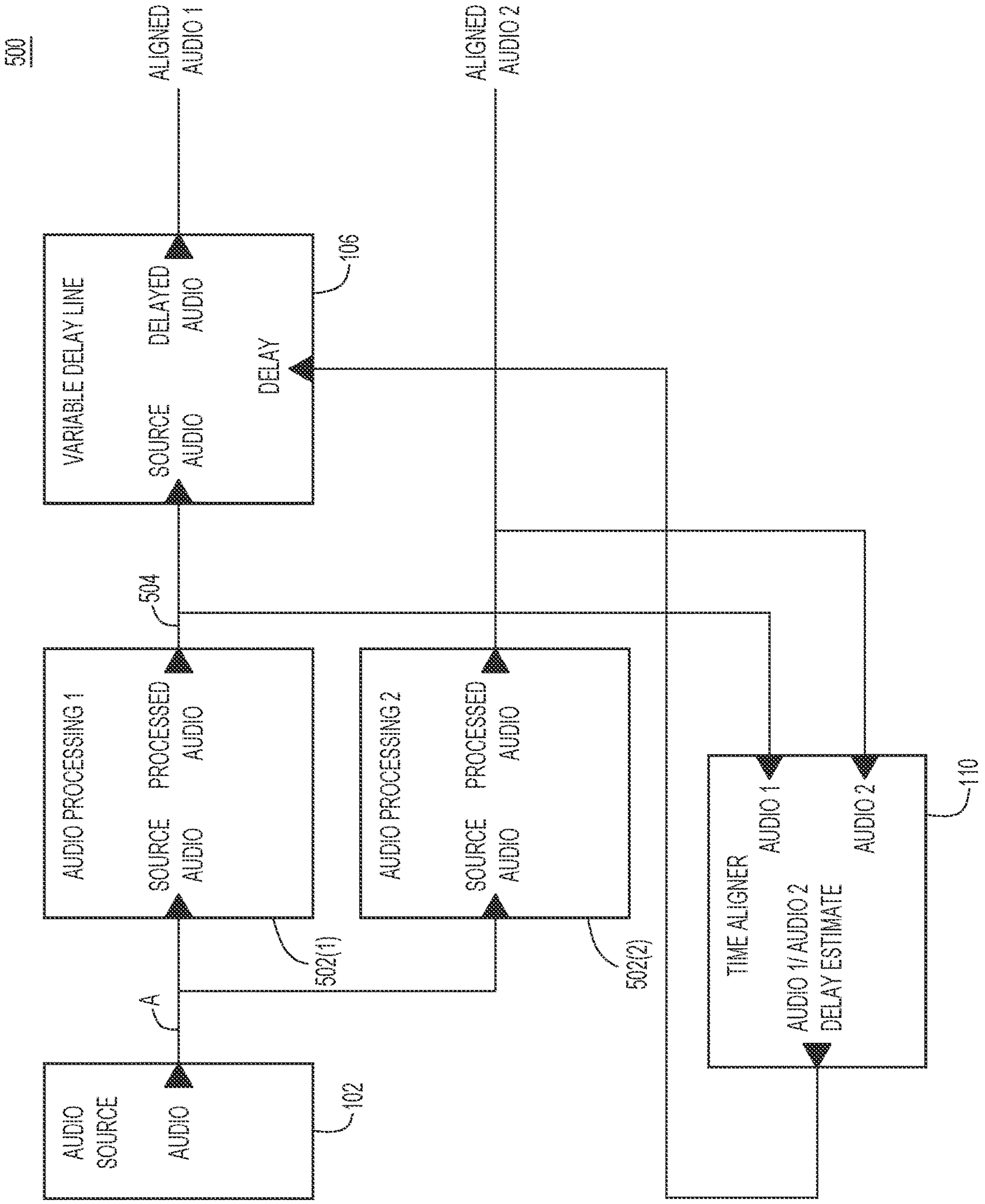
FIG. 5 is a block diagram of an example first generalized embodiment in which the time aligner may be used.

FIG. 5 is a block diagram of a first generalized time-alignment embodiment 500. Common audio A from audio source 102 is split into first common audio and second common audio. The first common audio and the second common audio are provided in parallel to first audio processing 502(1) and second audio processing 502(2), respectively. First audio processing 502(1) processes the first common audio to produce first processed audio 504, and provides the same to variable delay line 106 and to input audio 1 of time aligner 110, in parallel. Concurrently, second audio processing 502(2) processes the second common audio to produce second processed audio, denoted "aligned audio 2," and provides the same to input audio 2 of time aligner 110. The first processed audio 504 and the second processed audio (aligned audio 2) may be time delayed with respect to each other by a time delay due to different audio processing 502(1) and 502(2).

Time aligner 110 estimates the time delay between the first processed audio 504 and the second processed audio (aligned audio 2) to produce an estimated time delay, and generates a time delay control signal (e.g., time delay control signal CS described above) based on/indicative of the estimated time delay, and provides the same to the time delay control input of variable delay line 106. Variable delay line 106 imparts a controlled time delay to the first processed audio 504 responsive to the time delay control signal to produce aligned audio 1 in time alignment with aligned audio 2.

Figure 6:
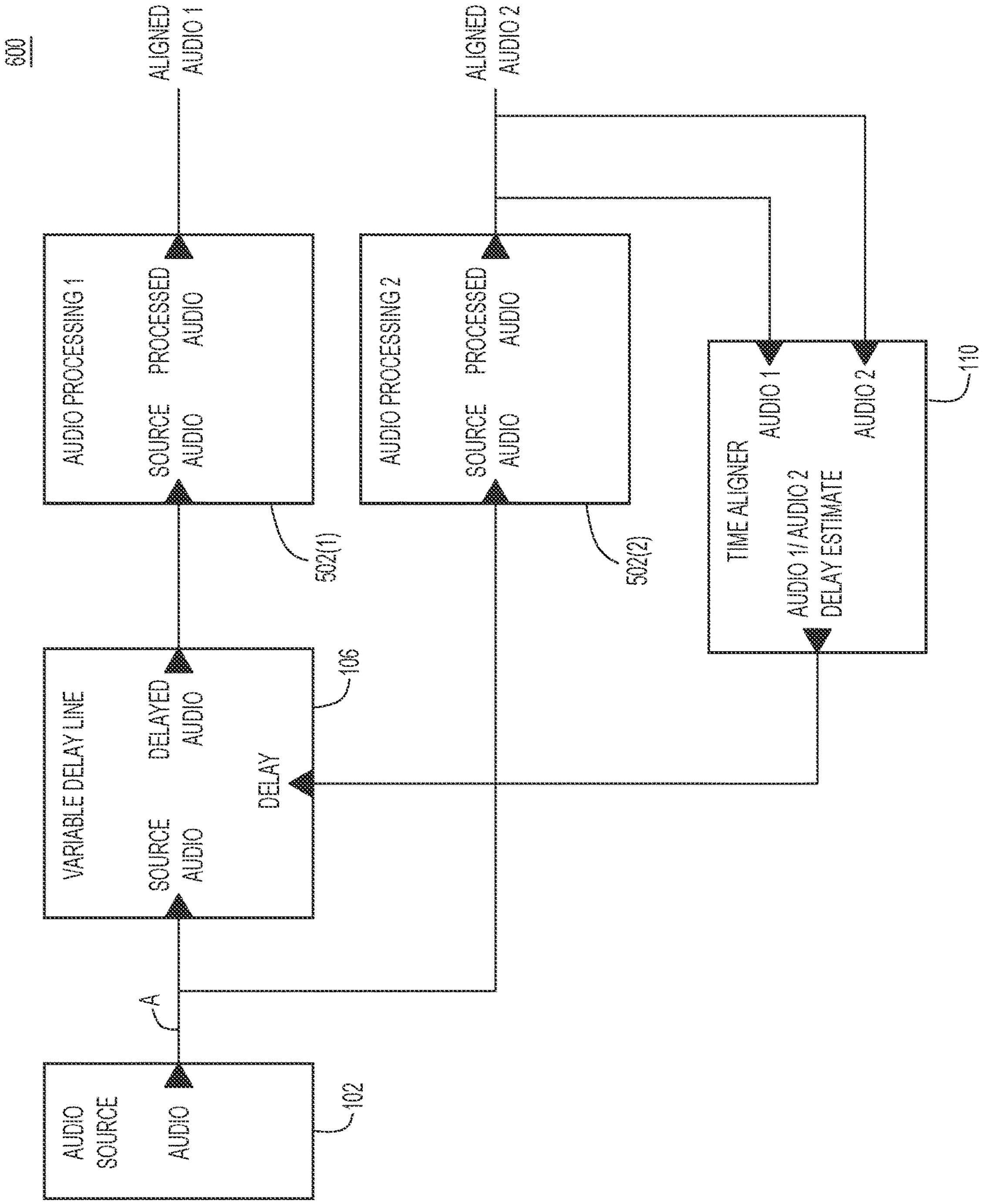
FIG. 6 is a block diagram of an example second generalized embodiment in which the time aligner may be used.

FIG. 6 is a block diagram of a second generalized time-alignment embodiment 600. Second generalized time-alignment embodiment 600 is similar to first generalized time-alignment embodiment 500, except that the order of first audio processing 502(1) and variable delay line 106 is reversed, i.e., the variable delay line precedes or is placed before the first audio processing. The reversed configuration works well in the context of IBOC digital radio broadcasting, where audio is broadcast to many recipients and therefore should be aligned before reception. The reversed configuration employs feedback control and addresses issues associated with feedback loop bandwidth and stability.

In second generalized time-alignment embodiment 600, variable delay line 106 time delays the first common audio by a controlled time delay responsive to the time delay control signal, to produce time-delayed first common audio. Then, audio processing 502(1) processes the time-delayed first common audio to produce processed, time-delayed, first common audio, denoted "aligned audio 1," and provides the same to input audio 1 of time aligner 110. Concurrently, second audio processing 502(2) processes the second common audio to produce second processed audio, denoted "aligned audio 2," and provides the same to input audio 2 of time aligner 110.

Time aligner 110 estimates the time delay between the aligned audio 1 and aligned audio 2 to produce an estimated time delay, generates the time delay control signal based on the estimated time delay, and provides the same to the time delay control input of variable delay line 106. Variable delay line 106 imparts a controlled time delay to the first common audio responsive to the time delay control signal to time align aligned audio 1 and aligned audio 2.

Figure 7:
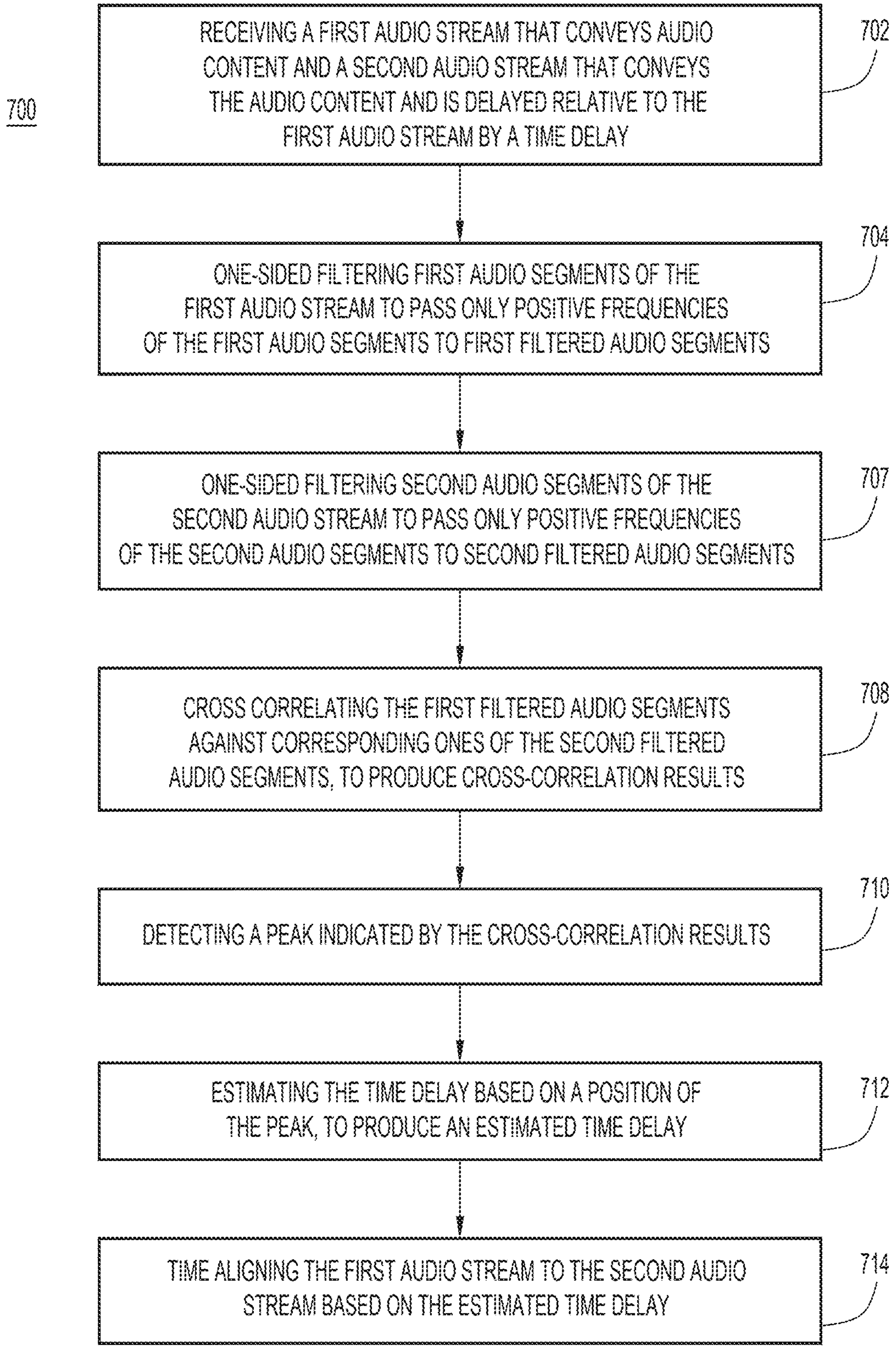
FIG. 7 is a flowchart of an example method of time aligning two audio streams.

FIG. 7 is a flowchart of an example method 700 of time aligning two audio streams that may have been processed differently. Operations of method 700 are described above. Method 700 may be performed primarily by time aligner 110.

702 includes receiving a first audio stream (e.g., HD1 audio) that conveys audio content (e.g., audio A) and a second audio stream (e.g., FM audio) that conveys the audio content and is delayed relative the first audio stream by a time delay.

704 includes one-sided filtering first audio segments of the first audio stream with a filter response configured to pass only positive frequencies of the first audio segments to first filtered audio segments.

707 includes one-sided filtering second audio segments of the second audio stream using the filter response to pass only positive frequencies of the second audio segments to second filtered audio segments.

The filter response may include a narrowband bandpass filter response that has a bandpass bandwidth and center frequency configured/selected to render the cross-correlation results invariant to a phase shift between the first audio segments and the second audio segments.

708 includes cross correlating the first filtered audio segments against corresponding ones of the second filtered audio segments, to produce cross-correlation results. Cross correlating may include cross correlating first complex envelopes of the first filtered audio segments against second complex envelopes of the corresponding ones of the second filtered audio segments to produce the cross-correlation results.

710 includes detecting a peak indicated by the cross-correlation results. To improve peak detection, the method may further include averaging the cross-correlation results to produce average cross-correlation results, and detecting by detecting the peak in the average cross-correlation results.

712 includes estimating the time delay based on a time position of the peak, to produce an estimated time delay.

714 includes time aligning the first audio stream to the second audio stream based on the estimated time delay. For example, time aligning may include imparting a controlled time delay into one of the first and second audio streams based on the estimated time delay.

The method may further include:

a. Computing cross powers of the first filtered audio segments against the corresponding ones of the second filtered audio segments.

b. Averaging the cross powers to produce an average cross power.

c. Computing a cross-correlation quality factor indicative of a quality of the peak based on the average cross-correlation results and the average cross power.

d. Determining whether to accept or reject the estimated time delay based on the quality.

In an embodiment, method 700 is implemented in an IBOC digital radio system to align HD1 audio to FM audio, for example. The system multiplexes the time aligned audio onto an IBOC digital radio hybrid waveform, and transmits the hybrid waveform over-the-air using a broadcast transmitter. That is, the system performs wirelessly broadcasting of the hybrid waveform.

Figure 8:
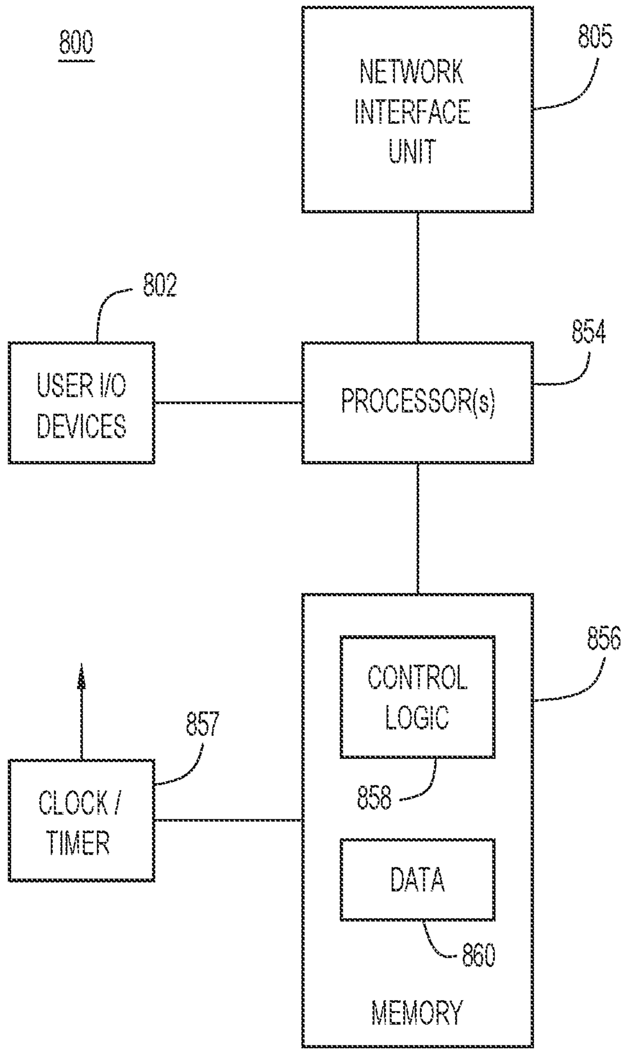
FIG. 8 is a block diagram of an example computer device that may perform operations described herein to implement the time aligner and time aligning.

FIG. 8 is a block diagram of an example controller or computer device 800 configured to perform operations described herein. There are numerous possible configurations for computer device 800 and FIG. 8 is meant to be an example. Computer device 800 may implement the various components and operations (including time aligner 110 and its operations) depicted in FIGS. 1-7. Computer device 800 may be integrated with an IBOC digital radio broadcast system.

Computer device 800 may include user input/output (I/O) devices 802 including a display, keyboard, and the like to enable a user to enter information into and receive information from the computer device. Computer device 800 includes a hardware and/or software implemented network interface unit 805 to communicate with a wired and/or wireless communication network, and to control devices over the network. Computer device 800 also includes a processor 854 (or multiple processors, which may be implemented as software or hardware processors), and memory 856 coupled to the processor. Computer device further includes a clock/timer subsystem 857 to provide various clock and timing signals to other components. Network interface unit 805 may include an Ethernet card with a port (or multiple such devices) to communicate over wired Ethernet links and/or a wireless communication card with a wireless transceiver to communicate over wireless links.

Memory 856 stores instructions for implementing methods described herein. Memory 856 may include read only memory (ROM), random access memory (RAM), magnetic disk storage media devices, optical storage media devices, flash memory devices, electrical, optical, or other physical/tangible (non-transitory) memory storage devices. The processor 854 is, for example, a microprocessor or a microcontroller that executes instructions stored in memory. Thus, in general, the memory 856 may comprise one or more tangible computer readable storage media (e.g., a memory device) encoded with software comprising computer executable instructions and when the software is executed (by the processor 854) it is operable to perform (e.g., cause the processor to perform) the operations described herein. For example, memory 856 stores control logic 858 to perform operations described herein, for example, operations performed by an importer, an exporter, an audio client, and so on.

The memory 856 may also store data 860 used and generated by control logic 858.

Note that in this Specification, references to various features (e.g., elements, structures, modules, components, logic, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations described with reference to the preceding figures illustrate only some of the possible scenarios that may be executed by one or more entities and components discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

Additionally, unless expressly stated to the contrary, the terms 'first', 'second', 'third', etc., are intended to distinguish the particular nouns they modify (e.g., element, condition, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

Although the techniques are illustrated and described herein as embodied in one or more specific examples, it is nevertheless not intended to be limited to the details shown, since various modifications and structural changes may be made within the scope and range of equivalents of the claims.

In summary, in some aspects, the techniques described herein relate to a method including: receiving a first audio stream that conveys audio content and a second audio stream that conveys the audio content and is delayed relative to the first audio stream by a time delay; one-sided filtering first audio segments of the first audio stream to pass only positive frequencies of the first audio segments to first filtered audio segments; one-sided filtering second audio segments of the second audio stream to pass only positive frequencies of the second audio segments to second filtered audio segments; cross correlating the first filtered audio segments against corresponding ones of the second filtered audio segments, to produce cross-correlation results; detecting a peak indicated by the cross-correlation results; and estimating the time delay based on a position of the peak, to produce an estimated time delay.

In some aspects, the techniques described herein relate to a method, further including: time aligning the first audio stream to the second audio stream based on the estimated time delay.

In some aspects, the techniques described herein relate to a method, further including: after time aligning, generating an in-band on-channel (IBOC) digital radio hybrid waveform having an analog modulated signal that conveys the first audio stream and a digitally modulated signal that conveys the second audio stream; and wirelessly broadcasting the IBOC hybrid digital radio hybrid waveform.

In some aspects, the techniques described herein relate to a method, wherein: one-sided filtering the first audio segments includes filtering the first audio segments with a narrowband bandpass filter response configured to pass the positive frequencies, and reject negative frequencies, of the first audio segments; and one-sided filtering the second audio segments includes filtering the second audio segments with the narrowband bandpass filter response configured to pass the positive frequencies, and reject the negative frequencies, of the second audio segments.

In some aspects, the techniques described herein relate to a method, wherein: the narrowband bandpass filter response has a bandpass bandwidth and center frequency configured to render the cross-correlation results invariant to a phase shift between the first audio segments and the second audio segments.

In some aspects, the techniques described herein relate to a method, wherein: cross correlating includes cross correlating first complex envelopes of the first filtered audio segments against second complex envelopes of the corresponding ones of the second filtered audio segments to produce the cross-correlation results.

In some aspects, the techniques described herein relate to a method, further including: averaging the cross-correlation results to produce average cross-correlation results, wherein detecting includes detecting the peak in the average cross-correlation results.

In some aspects, the techniques described herein relate to a method, further including: computing cross powers of the first filtered audio segments against the corresponding ones of the second filtered audio segments; averaging the cross powers to produce an average cross power; computing a quality factor indicative of a quality of the peak based on the average cross-correlation results and the average cross power; and determining whether to accept or reject the estimated time delay based on the quality factor.

In some aspects, the techniques described herein relate to a method, further including: processing the audio content to produce the first audio stream such that processing introduces a phase distortion between the first audio stream and the second audio stream, wherein one-sided filtering the first audio segments of the first audio stream and one-sided filtering the second audio segments of the second audio stream reduces a cross-correlating sensitivity to the phase distortion.

In some aspects, the techniques described herein relate to an apparatus including: a memory and a processor coupled to the memory, the processor configured to perform: receiving first audio segments that convey audio content and receiving second audio segments that convey the audio content and are delayed relative the first audio segments by a time delay; one-sided filtering the first audio segments to pass only positive frequency frequencies of the first audio segments to first filtered audio segments; one-sided filtering the second audio segments to pass only positive frequencies of the second audio segments to second filtered audio segments; cross correlating the first filtered audio segments against corresponding ones of the second filtered audio segments, to produce cross-correlation results; detecting a peak indicated by the cross-correlation results; and estimating the time delay based on a position of the peak, to produce an estimated time delay.

In some aspects, the techniques described herein relate to an apparatus, wherein the processor is further configured to perform: time aligning the first audio segments to the second audio segments based on the estimated time delay.

In some aspects, the techniques described herein relate to an apparatus, wherein the processor is further configured to perform: after time aligning, generating an in-band on-channel (IBOC) digital radio hybrid waveform having an analog modulated signal that conveys the first audio segments and a digitally modulated signal that conveys the second audio segments; and providing the IBOC hybrid digital radio hybrid waveform to a transmitter for wireless transmission.

In some aspects, the techniques described herein relate to an apparatus, wherein: the processor is configured to perform one-sided filtering the first audio segments by filtering the first audio segments with a narrowband bandpass filter response configured to pass the positive frequencies, and reject negative frequencies, of the first audio segments; and the processor is configured to perform one-sided filtering the second audio segments by filtering the second audio segments with the narrowband bandpass filter response configured to pass the positive frequencies, and reject the negative frequencies, of the second audio segments.

In some aspects, the techniques described herein relate to an apparatus, wherein: the narrowband bandpass filter response has a bandpass bandwidth and center frequency configured to render the cross-correlation results invariant to a phase shift between the first audio segments and the second audio segments.

In some aspects, the techniques described herein relate to an apparatus, wherein: the processor is configured to perform cross correlating by cross correlating first complex envelopes of the first filtered audio segments against second complex envelopes of the corresponding ones of the second filtered audio segments to produce the cross-correlation results.

In some aspects, the techniques described herein relate to an apparatus, wherein the processor is further configured to perform: averaging the cross-correlation results to produce average cross-correlation results, wherein detecting includes detecting the peak in the average cross-correlation results.

In some aspects, the techniques described herein relate to an apparatus, wherein the processor is further configured to perform: computing cross powers of the first filtered audio segments against the corresponding ones of the second filtered audio segments; averaging the cross powers to produce an average cross power; computing a quality factor indicative of a quality of the peak based on the average cross-correlation results and the average cross power; and determining whether to accept or reject the estimated time delay based on the quality factor.

In some aspects, the techniques described herein relate to an apparatus, wherein the processor is further configured to perform: processing the audio content to produce the first audio segments such that processing introduces a phase distortion between the first audio segments and the second audio segments, wherein one-sided filtering the first audio segments and one-sided filtering the second audio segments reduces a cross-correlating sensitivity to the phase distortion.

In some aspects, the techniques described herein relate to a non-transitory computer readable medium encoded with instructions that, when executed by a processor, cause the processor to perform: receiving first audio segments of FM audio that convey audio content and second audio segments of digital audio that convey the audio content and are delayed relative to the first segments by a time delay; one-sided filtering the first audio segments and the second audio segments to pass only positive frequencies of the first audio segments and the second audio segments to produce first filtered audio segments and second filtered audio segments, respectively; cross correlating the first filtered audio segments against corresponding ones of the second filtered audio segments, to produce cross-correlation results; averaging the cross-correlation results to produce average cross correlation results; detecting a peak of the average cross-correlation results; estimating the time delay based on a position of the peak, to produce an estimated time delay; and time aligning the first audio segments to the second audio segments based on the estimated time delay.

In some aspects, the techniques described herein relate to a non-transitory computer readable medium, further including instructions to cause the processor to perform: after time aligning, generating an in-band on-channel (IBOC) digital radio hybrid waveform having an analog modulated signal that conveys the first audio segments and a digitally modulated signal that conveys the second audio segments; and providing the IBOC digital radio hybrid waveform to a transmitter for transmission.

Each claim presented below represents a separate embodiment, and embodiments that combine different claims and/or different embodiments are within the scope of the disclosure and will be apparent to those of ordinary skill in the art after reviewing this disclosure.

What is claimed is:

1. A method comprising:

receiving a first audio stream that conveys audio content and a second audio stream that conveys the audio content and is delayed relative to the first audio stream by a time delay;

one-sided filtering first audio segments of the first audio stream to pass only positive frequencies of the first audio segments to first filtered audio segments;

one-sided filtering second audio segments of the second audio stream to pass only positive frequencies of the second audio segments to second filtered audio segments;

cross correlating the first filtered audio segments against corresponding ones of the second filtered audio segments, to produce cross-correlation results;

averaging the cross-correlation results to produce average cross-correlation results;

computing cross powers of the first filtered audio segments against the corresponding ones of the second filtered audio segments;

estimating the time delay based on the average cross-correlation results and an average computed cross powers;

aligning, based on the estimated time delay, the first audio stream and the second audio stream;

in response to aligning, generating an in-band on-channel (IBOC) digital radio hybrid waveform having an analog modulated signal that conveys the first audio stream and a digitally modulated signal that conveys the second audio stream; and wirelessly broadcasting the IBOC digital radio hybrid waveform.

2. The method of claim 1, wherein:

one-sided filtering the first audio segments includes filtering the first audio segments with a narrowband bandpass filter response configured to pass the positive frequencies, and reject negative frequencies, of the first audio segments; and one-sided filtering the second audio segments includes filtering the second audio segments with the narrowband bandpass filter response configured to pass the positive frequencies, and reject the negative frequencies, of the second audio segments.

3. The method of claim 2, wherein:

the narrowband bandpass filter response has a bandpass bandwidth and center frequency configured to render the cross-correlation results invariant to a phase shift between the first audio segments and the second audio segments.

4. The method of claim 1, wherein:

cross correlating includes cross correlating first complex envelopes of the first filtered audio segments against second complex envelopes of the corresponding ones of the second filtered audio segments to produce the cross-correlation results.

5. The method of claim 1, further comprising:
computing a quality factor indicative of a quality of a peak based on the average cross-correlation results and the average computed cross powers; and
determining whether to accept or reject the estimated time delay based on the quality factor.

6. The method of claim 1, further comprising:
processing the audio content to produce the first audio stream such that processing introduces a phase distortion between the first audio stream and the second audio stream,
wherein one-sided filtering the first audio segments of the first audio stream and one-sided filtering the second audio segments of the second audio stream reduces a cross-correlating sensitivity to the phase distortion.

7. An apparatus comprising:
a memory, and a processor coupled to the memory and configured to perform:
receiving first audio segments that convey audio content and receiving second audio segments that convey the audio content and are delayed relative to the first audio segments by a time delay;
one-sided filtering the first audio segments to pass only positive frequencies of the first audio segments to first filtered audio segments;
one-sided filtering the second audio segments to pass only positive frequencies of the second audio segments to second filtered audio segments;
cross correlating the first filtered audio segments against corresponding ones of the second filtered audio segments, to produce cross-correlation results;
averaging the cross-correlation results to produce average cross-correlation results;
computing cross powers of the first filtered audio segments against the corresponding ones of the second filtered audio segments;
estimating the time delay based on the average cross-correlation results and an average computed cross powers;
aligning, based on the estimated time delay, the first audio segments and the second audio segments;
in response to aligning, generating an in-band on-channel (IBOC) digital radio hybrid waveform having an analog modulated signal that conveys the first audio segments and a digitally modulated signal that conveys the second audio segments; and
wirelessly broadcasting the IBOC digital radio hybrid waveform.

8. The apparatus of claim 7, wherein:
the processor is configured to perform one-sided filtering the first audio segments by filtering the first audio segments with a narrowband bandpass filter response configured to pass the positive frequencies, and reject negative frequencies, of the first audio segments; and
the processor is configured to perform one-sided filtering the second audio segments by filtering the second audio segments with the narrowband bandpass filter response configured to pass the positive frequencies, and reject the negative frequencies, of the second audio segments.

9. The apparatus of claim 8, wherein:
the narrowband bandpass filter response has a bandpass bandwidth and center frequency configured to render the cross-correlation results invariant to a phase shift between the first audio segments and the second audio segments.

10. The apparatus of claim 7, wherein:
the processor is configured to perform cross correlating by cross correlating first complex envelopes of the first filtered audio segments against second complex envelopes of the corresponding ones of the second filtered audio segments to produce the cross-correlation results.

11. The apparatus of claim 7, wherein the processor is further configured to perform:
computing a quality factor indicative of a quality of a peak based on the average cross-correlation results and the average cross powers; and
determining whether to accept or reject the estimated time delay based on the quality factor.

12. The apparatus of claim 7, wherein the processor is further configured to perform:
processing the audio content to produce the first audio segments such that processing introduces a phase distortion between the first audio segments and the second audio segments,
wherein one-sided filtering the first audio segments and one-sided filtering the second audio segments reduces a cross-correlating sensitivity to the phase distortion.

13. A non-transitory computer readable medium encoded with instructions that, when executed by a processor, cause the processor to perform:
receiving first audio segments of FM audio that convey audio content and second audio segments of digital audio that convey the audio content and are delayed relative to the first audio segments by a time delay;
one-sided filtering the first audio segments and the second audio segments to pass only positive frequencies of the first audio segments and the second audio segments to produce first filtered audio segments and second filtered audio segments, respectively;
cross correlating the first filtered audio segments against corresponding ones of the second filtered audio segments, to produce cross-correlation results;
averaging the cross-correlation results to produce average cross-correlation results;
computing cross powers of the first filtered audio segments against the corresponding ones of the second filtered audio segments;
estimating the time delay based on the average cross-correlation results and an average computed cross powers;
time aligning the first audio segments to the second audio segments based on the estimated time delay;
in response to time aligning, generating an in-band on-channel (IBOC) digital radio hybrid waveform having an analog modulated signal that conveys the first audio segments and a digitally modulated signal that conveys the second audio segments; and
wirelessly broadcasting the IBOC digital radio hybrid waveform.

* * * * *